United States Patent
Ilyin et al.

(10) Patent No.: US 9,153,122 B2
(45) Date of Patent: Oct. 6, 2015

(54) ENVIRONMENTAL ALERT FOR COMPUTER SYSTEMS

(71) Applicant: EMC Corporation, Hopkinton, MA (US)

(72) Inventors: Mikhail Alexandrovich Ilyin, St. Petersburg (RU); Vitaly Stanislavovich Kozlovsky, St. Petersburg (RU)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/983,589

(22) PCT Filed: Sep. 27, 2012

(86) PCT No.: PCT/RU2012/000784
§ 371 (c)(1),
(2) Date: Aug. 5, 2013

(87) PCT Pub. No.: WO2014/051456
PCT Pub. Date: Apr. 3, 2014

(65) Prior Publication Data
US 2014/0340223 A1    Nov. 20, 2014

(51) Int. Cl.
| | |
|---|---|
| G08B 21/00 | (2006.01) |
| G08B 25/00 | (2006.01) |
| G06F 9/54 | (2006.01) |
| H04L 12/24 | (2006.01) |
| H04L 12/28 | (2006.01) |
| G08B 25/08 | (2006.01) |
| G08B 25/14 | (2006.01) |
| G06F 11/14 | (2006.01) |
| G08B 17/10 | (2006.01) |

(52) U.S. Cl.
CPC .............. *G08B 25/006* (2013.01); *G06F 9/542* (2013.01); *G06F 11/1412* (2013.01); *G08B 17/10* (2013.01); *G08B 25/08* (2013.01); *G08B 25/14* (2013.01); *H04L 12/2823* (2013.01); *H04L 12/2825* (2013.01); *H04L 41/0213* (2013.01)

(58) Field of Classification Search
CPC ............................ H04L 41/0213; G06F 9/542
USPC ................... 340/540; 709/223, 224; 719/318
See application file for complete search history.

(56) References Cited

U.S. PATENT DOCUMENTS

| | | | | |
|---|---|---|---|---|
| 6,363,422 | B1 * | 3/2002 | Hunter et al. ................. | 709/224 |
| 6,496,949 | B1 * | 12/2002 | Kanevsky et al. ............ | 714/47.1 |
| 6,714,977 | B1 * | 3/2004 | Fowler et al. ................. | 709/224 |
| 7,286,158 | B1 * | 10/2007 | Griebenow .................... | 348/156 |
| 2004/0160897 | A1 | 8/2004 | Fowler et al. | |
| 2009/0164031 | A1 * | 6/2009 | Johnson et al. .............. | 709/224 |

FOREIGN PATENT DOCUMENTS

| | | |
|---|---|---|
| GB | 2472787 A | 2/2011 |
| JP | 2003-101655 A | 4/2003 |
| JP | 2007-241798 A | 9/2007 |

* cited by examiner

*Primary Examiner* — John A Tweel, Jr.
(74) *Attorney, Agent, or Firm* — BainwoodHuang

(57) ABSTRACT

Improved efficiency in monitoring environmental conditions in the vicinity of an unattended computer system includes using the existing communication systems between the computer system and a network, to provide immediate information to users, emergency responders and anyone connected to the network. The system may also include an ability of the unattended computer system to receive a return message from the user ordering a physical action in response to the reported environmental condition, for example turning on a fire suppression system in response to a smoke alarm. The system may also include storage of environmental conditions and analysis of variations over time, as well as any interactions of various types of environmental conditions, such as giving more weight to a high temperature reading in conjunction with an elevated but not critical level of smoke.

15 Claims, 4 Drawing Sheets

ENVIRONMENTAL ALERT FOR COMPUTER SYSTEMS

BACKGROUND

Some computer systems operate in highly controlled environments. For example, certain advanced server and storage systems, for which downtime tolerance is very low, operate in a specifically designed raised floor computer room having temperature and humidity control as well as various safety systems such as fire alarms and fire suppression systems.

In some cases, users of such computer systems operate at locations that are remote from the computer systems. In such a scenario, the user relies on the safety and monitoring systems to lower the risk of particular catastrophic causes of computer system downtime.

A conventional approach to monitoring the environment in the vicinity of an unattended computer system involves one or more sensing devices individually wired, for example, to an audible fire alarm, or to a response center specific to the sensor, such as a local fire department. The conventional approach uses separate sensors individually connected to selected response locations using communication methods separate from the computer system.

SUMMARY

The conventional approach to monitoring the environment in the vicinity of an unattended computer system is expensive and inflexible, due to the conventional use of separate communication methods for the sensor devices. The use of communication methods already existing in the computer system itself would reduce the time, equipment cost and labor cost of implementing environmental monitoring systems. The conventional approach is also more complex since any change in the location to be alerted in case of environmental emergency can require costly individual changes to the communication connections.

Further, in the conventional approach to monitoring, a user at a remote location may only learn about a catastrophe indirectly. For example, a fire alarm may only provide an audible alert and an electronic alert to a local fire station. The remote user would not know about the fire until the computer ceased to function due to the fire, or power being shut off, or water damage to the computer system. In such a situation the user would not have sufficient notice to reduce the operational damage by initiating mirrored computer operations at a back up facility, or storing important data at an emergency data back up location separate from the primary site.

In contrast to the conventional approach to monitoring the environment in the vicinity of an unattended computer system which is expensive and indirect, an improved technique communicates environmental conditions surrounding a computer system to a user remote from the computer system via a sensor device, for example a smoke detector, connected to a communication port of the computer system. Along these lines, an installer of the computer system may connect a sensor to a port of the computer system. Upon installation, the computer system receives an acknowledgement of the connection with the sensor so that proper sensing is assured. Once the sensor detects some physical condition (i.e. temperature increase, presence of airborne particulates), the sensor sends a message to the computer system. The computer system then relays the message to safety monitors, proper authorities, and/or the user.

Advantageously, the use of the existing communication methods increases the capability of environmental monitoring by enabling local or remote storage and analysis of the environmental sensor output signals. For example, storage of ongoing sensor data in the computer system may be analyzed so that slowly developing environmental issues, for example a steadily rising temperature, may generate an appropriate response before a critical level is reached.

One embodiment of the improved technique is directed to a monitoring method communicating environmental conditions in the vicinity of a computer system to a remote user by receiving a signal from an environmental condition sensor located in the vicinity of the computer system at an ingress communication port of the computer system. The ingress port may be any sort of input/output (i.e., I/O) port. The method then stores a value representative of the received signal, indicating a physical condition, for example a temperature or a humidity reading. Then the method transmits a notification signal to the remote user based upon the stored value, using an egress communication port. The egress port may be the same port as the ingress port, or may be a different physical port, or may be a different type of port, for example, a wireless port. The notification signal will indicate a physical condition measured by the sensor, for example a temperature reading, and may indicate a problem that needs emergency attention, for example a high enough temperature to indicate that a fire exists.

The method may also involve storing the values locally in the computer system and comparing them against stored limit ranges and previously stored values. These comparisons enable evaluating the environmental conditions based on a time dependent function of the stored values or evaluating combinations of different environment factors to form an overall environmental condition, for example, combining temperature with smoke values to better determine when a fire alarm should be issued, or when to copy sensitive records to a safe off site storage facility.

Another embodiment of the improved technique with improved environmental monitoring capability is directed towards a computer program product with a computer-readable storage medium with code to receive a condition signal from a sensor at an ingress communication port of the computer system, to store a value represented by the condition signal, and to transmit from an egress communication port, a notification signal to the remote user. The ingress and egress ports may be the same physical port and may be any communications port suited to electronic signal transferring, including wired or wireless input ports, output ports or I/O ports. The code to receive condition signals may include capability to receive signals from, for example, smoke, fire, motion, intrusion, power integrity, vibration, humidity, water and temperature sensors.

Yet another embodiment of the improved technique is directed towards a system constructed and arranged to provide environmental conditions in the vicinity of a computer system to a remote user, may include a network interface, an ingress communication port, an egress communication port which may be the same port as the ingress port, a memory element, and a controller to receive condition signals from environmental sensors. The system can store a value representing the condition signal in the memory, and then transmit a notification signal to the remote user.

One embodiment of the system can also use the egress communication port to transmit a service signal to a service center in response to an action signal from the remote user. For example, the remote user may receive a fire and a smoke sensor signal and determine that it may be useful to move data stored at the computer system to a secure off site backup storage center. The user may also determine that activating local water shut off valves to prevent flooding, or turning on a local fire suppression system, or activating electronically controlled safety fire doors, may be needed, and may efficiently use the existing computer communications systems to take the needed actions by sending an action signal.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved system for communicating environment conditions in the vicinity of a computer system is less expensive, installs more quickly, and has great efficiency than current systems by using the already existing communication system in the computer system as at least a part of the sensor network used to measure the environment and communicate environmental alerts.

Figure 1:
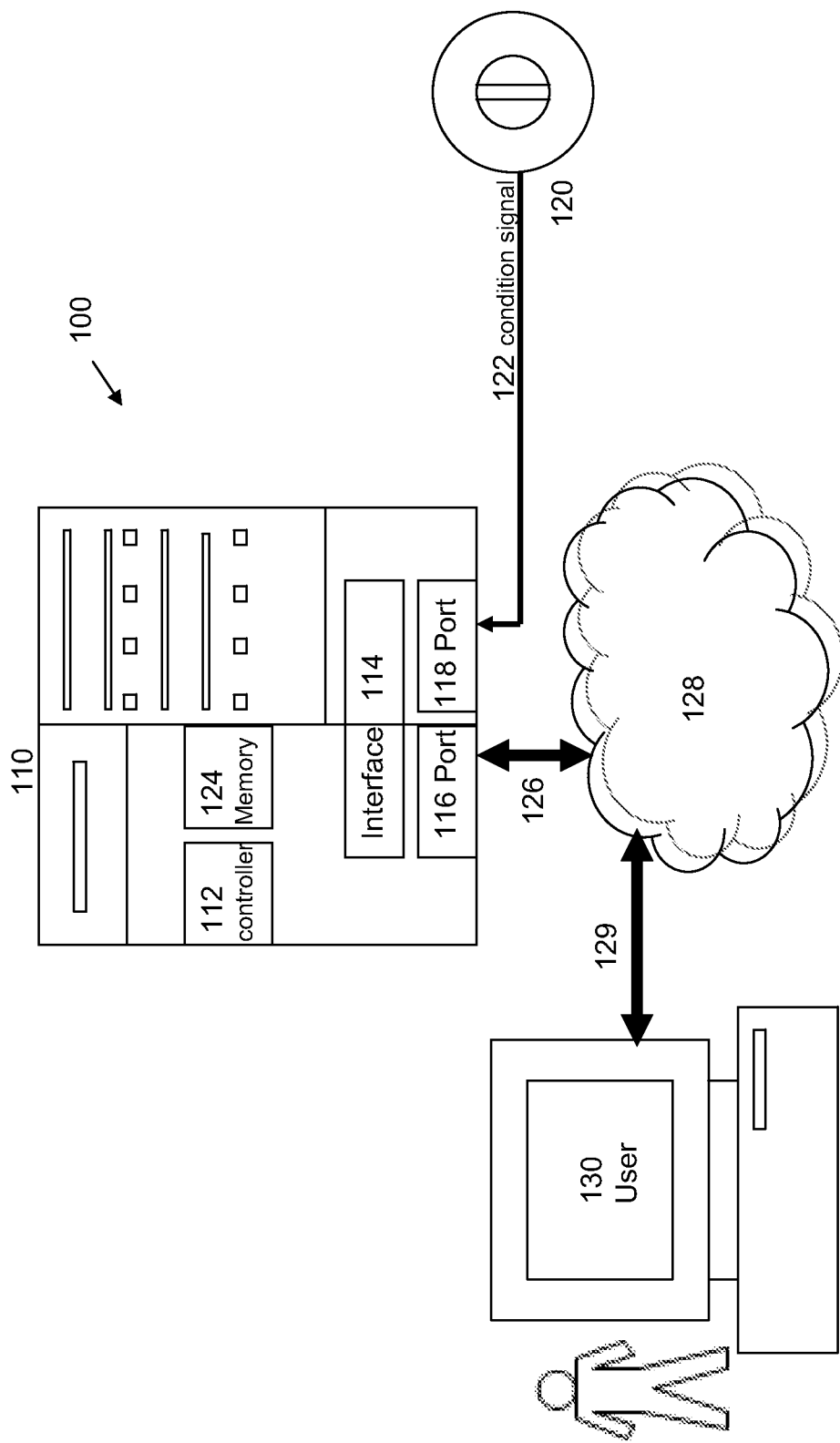
FIG. 1 is a block diagram illustrating an example computer system using the improved technique.

FIG. 1 is a block diagram illustrating an example system 100 using the improved technique with device 110 representing any computer system such as a laptop, a server, a computer disk memory farm, a storage system, a graphics image processor, a super computer, a massively parallel array of microcomputers or any electronic device having computing and communicating ability. Computer system 110 includes a controller 112 having logic circuits and control circuitry to operate the computer system and communicate data and other signals to users or other devices and computer systems. These communications are implemented by a network interface circuit 114, which is communicatively attached to at least one egress communications port 116 and at least one ingress communications port 118. The ingress and egress ports are shown as separate and distinct objects, but the invention is not so limited, and the ingress and egress ports may be the same single port, and may be either wired or wireless, or be any sort of communications device, such as an input port, an output port, or an input/output (I/O) port as the particular needs of the computer system 110 require. The communications protocol of the ports 116 and 118 may be of any sort including parallel, serial, USB, 801.11, Ethernet, internet, 4G LTE, 3G or Blue Tooth.

The computer system 110 receives environmental condition signals from a sensor 120 located at a selected position in the vicinity of the computer system 110. The position may depend upon the type of sensor, for example a smoke sensor may be located on the ceiling at the top of a staircase or other location where smoke may rise and concentrate. The sensor 120 will send an environmental condition signal on communication path 122, for example indicating the presence of significant amounts of smoke. Alternatively, sensor 120 may send periodic update signals even when the measured levels are not significant.

The condition signal on communication path 122, shown as a wired connection in the illustrative figure, travels to the controller 112 via ingress port 118 and interface 114, where the condition signal may be interpreted as a value, and stored in memory location 124. If the value of the condition signal is outside of a limit range, which may also be stored in the memory 124, then the controller 112 will send a notification signal to the egress port 116 via network interface 114, and via the communication path 126 to a network 128, shown in the illustrative figure as the cloud. The network 128 may be any sort of communication network, for example, the internet, an intranet, a LAN, a phone line, a radio transceiver, or a dedicated hard line. The user 130 receives the notification signal from the network via communication path 129, and can send a signal back to the computer, as will be presently discussed.

With such an arrangement an environmental condition signal can be rapidly and efficiently transmitted to a remote user 130 from the sensor 120 without need of costly separate communication devices for the sensor 120. The condition signal can also be analyzed and evaluated as compared to other types of sensors, not shown for simplicity in FIG. 1, for a more complete evaluation of the environmental condition than is available from the sensor output alone. For example, the sensor 120 shown may be a smoke detector which operates by examining the transparency of a specified column of air, and may incorrectly interpret a cloud of condensing steam as an excessively high level of smoke from a fire. Thus, an erroneous alarm may be broadcast when it might have been avoided by making a comparison to an adjacent ionization type fire detector. The present improved system can use the controller 112 to evaluate the condition signal values from many different sensors stored in memory 124 to determine the presence of an emergency with improved accuracy.

Figure 2:
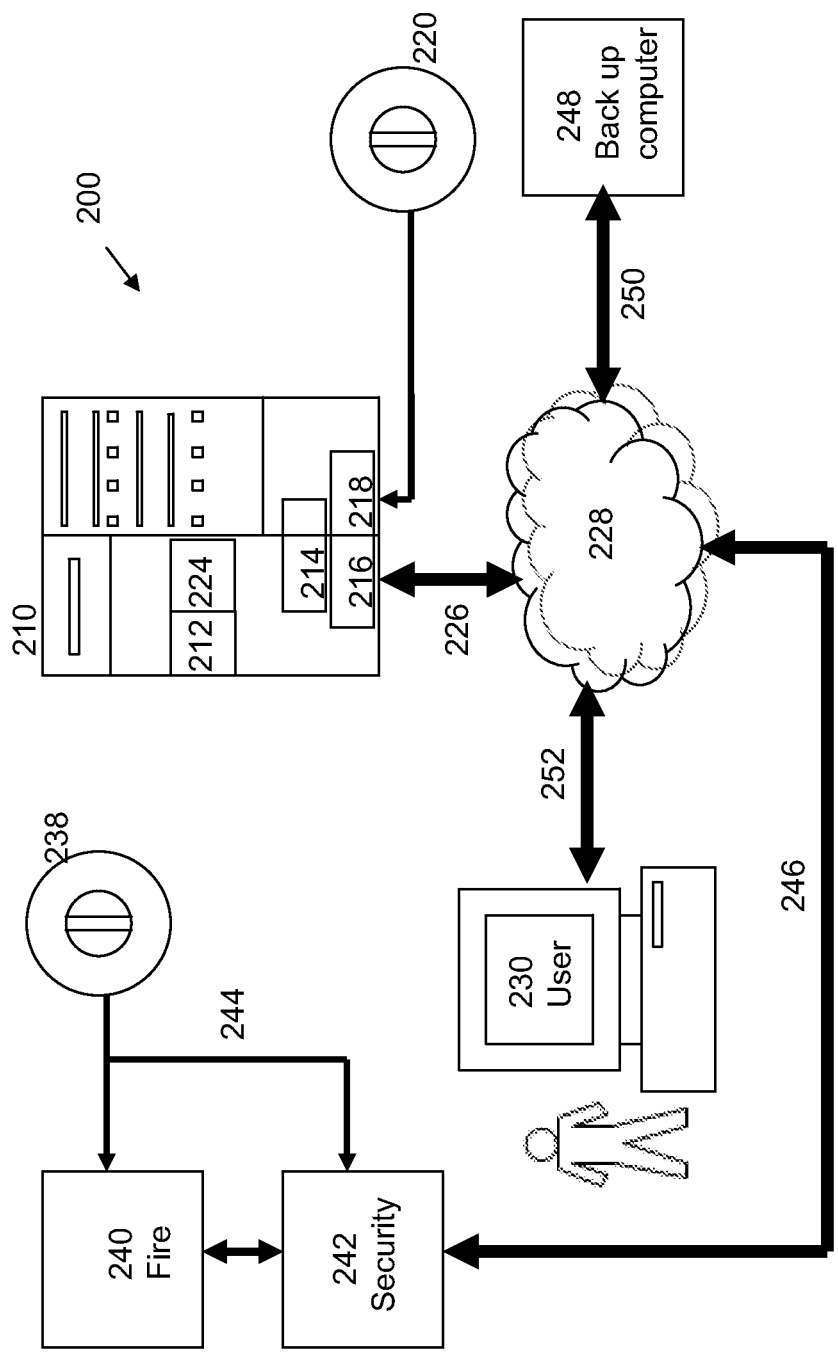
FIG. 2 is a block diagram illustrating an example computer system with additional features over the computer system of FIG. 1.

FIG. 2 is a block diagram illustrating an example system 200 with additional features over the system of FIG. 1. In FIG. 2 the elements previously discussed with respect to FIG. 1 have similar numbers, and the previous discussion will not be repeated.

FIG. 2 shows the situation where a computer system, such as a memory storage device, is installed in an environment that already has a previously installed sensor 238. The improved system provides a parallel and partially redundant environmental condition sensor system to improve reliability and capability at low cost. Fire sensor 238 is shown as being hardwire connected to a local fire station 240 and to a centralized alarm center 242 by communication paths 244, shown as cables in the illustrative figure, but any sort of communication system may be used. The alarm center 242 may alert the user 230 directly (not shown) or the fire station 240, and may have connection to the network 228 via communication path 246, and thus potentially to the user 230.

FIG. 2 also shows that the computer system 210 can transfer data or active processes to a back up computer system 248 via communication path 250 to prevent data loss and minimize lost processing capability. For example, in the case where 210 represents a storage system, the data stored may be emergency backed up by storing a current copy of the data at another storage system at 248. Such a transfer of data may be in response to an action signal from user 230 via communication path 252 via network 228, and eventually to controller 212. Alternatively, the controller 212 may have code to determine that in certain environmental conditions, for example, a specified time after sending a notification signal and not receiving a response, that the data transfer may be made. The controller 212 may also receive an action signal to take action to limit the damage of an environment condition, for example turning on a fire suppression system in response to a fire, or turn off a water valve controlling water lines to the vicinity of the computer system in response to a flood indication.

The system shown may be implemented in any computer system, such as a memory storage system, as a computer program product having a non-transitory, computer-readable storage medium storing code to communicate environmental conditions in the vicinity of a computer system to a remote user as described previously. The software used in the computer system to evaluate the data or to drive the ingress 218 and egress 216 ports may be of any type. The user 230 is shown as being a workstation, but the invention is not so limited, and the user 230 may be in contact with the system 210 via a handheld device using any of a variety of well known mobile applications.

Figure 3:
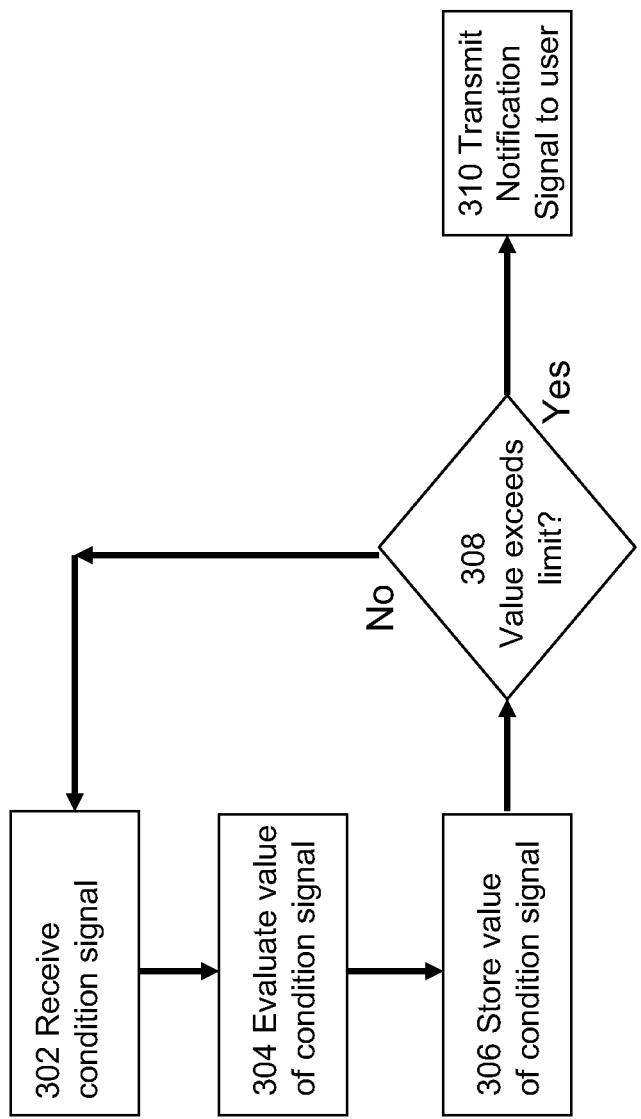
FIG. 3 is a flowchart illustrating the improved method.

FIG. 3 is a flowchart illustrating the improved method. At step 302 a condition signal is received, for example at ingress port 218. At step 304 the condition signal is evaluated, for example in the controller 212 discussed previously, to establish a value representing the environmental condition indicated by the signal. At step 306 the value is stored, for example in a memory such as memory 224 in FIG. 2 as discussed previously.

At step 308 it is determined if the value from step 304 has exceeded the limit, for example a stored limit range of a single sensor reading, or as a time dependent change as compared to previous sensor reading from the same sensor, or as a combination of readings from a variety of different sensors, some being of different types. If the value is within the allowable range then the process returns to step 302 and repeats with a new sensor signal, either from the same sensor, or from a different sensor of the same type, or from a sensor of a different type. If at step 308 the value is outside the allowable limits then the process moves to step 310 and a notification signal is sent to the user as previously discussed. Although the notification signal is only illustratively shown in FIG. 3 as going to the user, the invention is not so limited and notification signals may be sent to any number of other selected locations.

Figure 4:
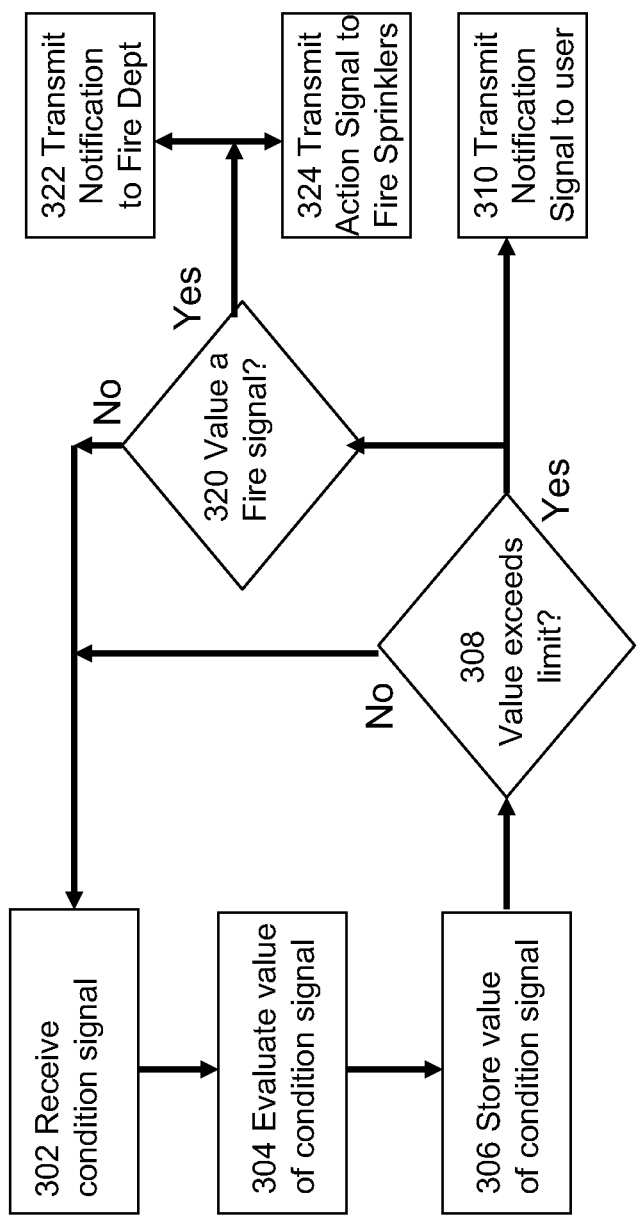
FIG. 4 is a flowchart illustrating the improved with additional features over the method of FIG. 3.

FIG. 4 is a flowchart illustrating the improved method with additional features over the method of FIG. 3. In FIG. 4 the elements have similar numbers to those discussed previously, and the previous discussion will not be repeated.

In the case where a notification signal is sent to the user, in FIG. 4 the process also determines at step 320 if the sensor which caused the notification signal to be sent was a fire sensor. If the sensor was not a fire sensor the process returns to step 302 and repeats the process from the beginning with a new sensor signal. If the determination at step 320 is that it is a fire sensor then another notification signal is sent to a preselected fire department at step 322. Alternatively, or in addition to step 322, an action signal may be sent by the computer system 210 to the fire suppression system in the vicinity of the computer system at step 324. Step 324 may be restricted to reception of an action signal from the user 230, or it may be initiated by the processor 212, as discussed previously. The improved technique uses existing communication systems in a computer system to provide fast environment sensor reports to an easily varied selection of users and responders, while reducing installation cost and time, or providing redundancy and increased analytic capability to pre existing environmental sensor systems. Using the computation power of the computer system to evaluate time varying environmental signals, or to combine the readings from different types of environmental sensors, can result in the accurate determination of an emergency condition before any single sensor can reach the critical level readings required for a proper alarm signal.

While various embodiments of the present disclosure have been particularly shown and described, it will be understood by those skilled in the art that various changes in form and details may be made therein without departing from the spirit and scope of the present disclosure as defined by the appended claims.

What is claimed is:

1. A method of communicating environmental conditions in the vicinity of a computer system to a remote user, the method comprising:
   receiving a condition signal from an environmental condition sensor located in the vicinity of the computer system at an ingress communication port of the computer system;
   storing a value represented by the condition signal, the value indicating a physical condition of the vicinity around the computer system; and
   transmitting, from an egress communication port, a notification signal to the remote user based upon the value, the notification signal indicating a physical condition;
   further comprising receiving condition signals from a set of environmental condition sensors including at least one of smoke, fire, motion, intrusion, power integrity, vibration, humidity, water and temperature sensors;
   wherein each of the condition signals is represented by a value;
   wherein the method further comprises:
   storing a value represented by a condition signal in the computer system;
   comparing the stored value against a first limit range to produce a first comparison result, the first comparison result indicating whether the stored value is within the first limit range;
   evaluating an overall environmental condition based upon a time dependent function of an interaction between at least two different, previously stored values to produce an interaction value;
   comparing the interaction value against a second limit range to produce a second comparison result, the second comparison result indicating whether the interaction value is within the second limit range; and
   transmitting the notification signal if either (i) the first comparison result indicates that the stored value is not within the first limit range or (ii) the second comparison result indicates that the interaction value is not within the second limit range; and
   not transmitting the notification signal if (i) the first comparison result indicates that the stored value is within the first limit range and (ii) the second comparison result indicates that the interaction value is within the second limit range.

2. The method of claim 1, further comprising transmitting notification signal to a fire department in response to receiving a smoke condition signal.

3. The method of claim 1, further comprising receiving the condition signal at the ingress communication port via wireless transmission.

4. The method of claim 1, further comprising:
   storing the values locally in the computer system;
   comparing the stored values against stored limit ranges; and
   transmitting the notification signal based on a time dependent function of the stored values and evaluating an overall environmental condition representing a combination of the stored values of the condition signals.

5. The method of claim 1, wherein transmitting the notification signal to the remote user of the computer system includes providing the notification signal to at least one of an emergency response center, a remote data storage center, and an emergency backup data operation center.

6. The method of claim 1, further comprising responding to an action signal transmitted from the remote user by transmitting a service signal to at least one of a backup data storage center remote from the computer system to receive data, a warning system, a service center, a local water shut off valve, a local fire suppression system, local air conditioning system, and electronically controlled safety doors.

7. A computer program product having a non-transitory, computer-readable storage medium which stores code to communicate environmental conditions in the vicinity of a computer system to a user remote from the computer system, the code including instructions to:
receive a condition signal from an environmental condition sensor in the vicinity of the computer system at an ingress communication port of the computer system;
store a value represented by the condition signal; and
transmit from an egress communication port, a notification signal to the remote user based upon the value;
further comprising code to receive condition signals from environmental condition sensors comprising smoke, fire, motion, intrusion, power integrity, vibration, humidity, water and temperature sensors;
further comprising code to transmit from the communication port a notification signal to a fire department in response to condition signals from the fire sensor, and code to evaluate an overall environmental condition from stored values of the condition signals;
further comprising code to transmit the notification signal to the remote user based on a time dependent function of the stored values;
further including evaluating an overall environmental condition based upon the time dependent function by producing an interaction value representing a difference between the stored value and a previously stored value, the stored value and the previously stored value representing condition signals from the same sensor.

8. The computer program product of claim 7, further comprising code to transmit the notification signal to the remote user and to at least one of an emergency response center, a remote data logging, storage and analysis center, and an emergency backup data operation center.

9. The computer program product of claim 7, further comprising code to transmit a service signal to at least one of a backup data storage center remote from the computer system to receive data, a warning system, a service center, a local water shut off valve, a local fire suppression system, local air conditioning system, and electronically controlled safety doors, in response to an action signal from the remote user.

10. A system constructed and arranged to provide environmental conditions in the vicinity of a computer system to a remote user, the system comprising:
a network interface;
an ingress communication port;
an egress communication port;
a memory element; and
a controller including controlling circuitry constructed and arranged to:
receive a condition signal from an environmental condition sensor in the vicinity of the computer system via the ingress communication port;
store a value represented by the condition signal in the memory; and
transmit, via the egress communication port, a notification signal to the remote user based upon the value;
the controller constructed and arranged to:
receive condition signals from environmental condition sensors comprising smoke, fire, motion, intrusion, power integrity, vibration, humidity, water and temperature sensors;
transmit from the communication port a notification signal to a fire department in response to condition signals from the fire sensor, and code to evaluate an overall environmental condition from stored values of the condition signals;
transmit the notification signal to the remote user based on a time dependent function of the stored values; and
evaluate an overall environmental condition based upon the time dependent function by producing an interaction value representing a difference between the stored value and a previously stored value, the stored value and the previously stored value representing condition signals from the same sensor.

11. The system of claim 10, wherein further the egress communication port transmits a notification signal to the remote user based on a time dependent function of the stored values.

12. The system of claim 10, wherein further the egress communication port transmits the notification signal to the remote user and to at least one of an emergency response center, a remote data logging, storage and analysis center, and an emergency backup data operation center.

13. The system of claim 10, wherein further the egress communication port transmits a service signal to at least one of a backup data storage center remote from the computer system to receive data, a warning system, a service center, a local water shut off valve, a local fire suppression system, local air conditioning system, and electronically controlled safety doors, in response to an action signal from the remote user.

14. The system of claim 10, further including remote memory storage and analysis units, the communication port transmits substantially simultaneous signals to the remote user, fire department, police department, security department, and service center in response to the stored values.

15. The method of claim 1, wherein evaluating the overall environmental condition based upon the time dependent function includes producing, as the interaction value, a difference between the stored value and a previously stored value, the stored value and the previously stored value representing condition signals from the same sensor.

* * * * *